United States Patent [19]
Makita

[11] Patent Number: 4,771,994
[45] Date of Patent: Sep. 20, 1988

[54] HYDRAULIC DAMPER AND AIR SPRING UNIT

[75] Inventor: Naoki Makita, Yokohama, Japan

[73] Assignee: Tokico Ltd., Kanagawa, Japan

[21] Appl. No.: 946,503

[22] Filed: Dec. 19, 1986

[30] Foreign Application Priority Data

Dec. 20, 1985 [JP] Japan .......................... 60-196212[U]

[51] Int. Cl.$^4$ .............................................. F16F 9/08
[52] U.S. Cl. ................................... 267/64.21; 267/220
[58] Field of Search ...................... 267/8 R, 35, 64.19, 267/64.21, 64.24, 64.27, 220; 280/707, 710, 712; 11/21

[56] References Cited

U.S. PATENT DOCUMENTS 4,555,096 11/1985 Pryor ........................... 267/64.21 X

FOREIGN PATENT DOCUMENTS 986327 3/1965 United Kingdom ............. 267/64.24

Primary Examiner—Duane A. Reger
Attorney, Agent, or Firm—Wenderoth, Lind & Ponack

[57] ABSTRACT

A hydraulic damper and air spring unit of the type including a hydraulic damper main body provided with a piston rod slidingly projecting upwards therefrom, a tubular member with the lower end thereof being secured to the outer periphery of the main body and the upper end extending upwards around the main body, and a rolling rubber member being provided between the upper end of the tubular member and a shell secured to the upper end of the piston rod to define an air chamber surrounding the piston rod and the upper portion of the main body. The tubular member includes an annular spacer with one end being sealingly secured to the outer periphery of the damper main body and having an annular shoulder at the other end, and a piston member having on one end a retaining portion which is engageable with the shoulder on the spacer and further having a tubular portion surrounding the upper portion of the damper main body with a spaced relationship and connected to the rubber member, the retaining portion being sealingly connected to the shoulder, whereby the reliability of welding is improved.

5 Claims, 2 Drawing Sheets

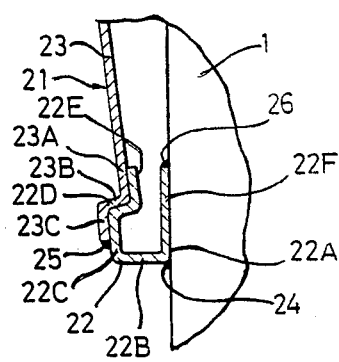
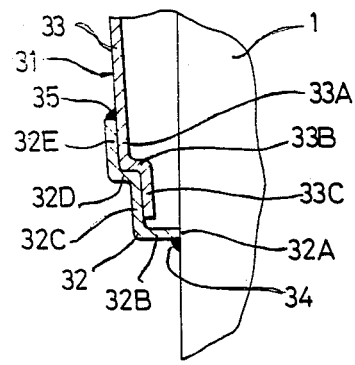
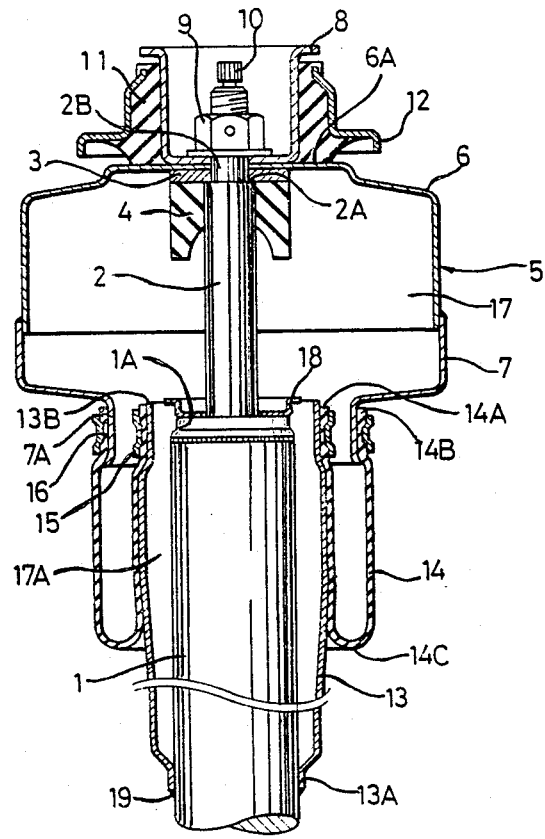
FIG. 4 PRIOR ART

HYDRAULIC DAMPER AND AIR SPRING UNIT

FIELD OF THE INVENTION

This invention relates to a hydraulic damper and air spring unit for use in such as a suspension system of a vehicle such as an automobile.

PRIOR ART

A typical prior art hydraulic damper and air spring unit is shown in FIG. 4, which comprises a hydraulic damper main body 1 incorporating therein constituent parts such as a piston and the like (not shown), with the upper end thereof being capped by a cap 1A which is secured by seam welding or the like. A piston rod 2 projects axially upwards through the cap 1A of the damper main body 1 and has on the projecting end a small diameter portion 2B defining a shoulder portion 2A between the remaining portion. There is formed on the small diameter portion 2B external screw threads for engaging with a nut 9 which will hereinafter be described. A retainer 3 passes through the small diameter portion 2B and is mounted on the shoulder portion 2A and is secured to a bottom portion 6A of an upper shell 6 which also will be explained hereinafter. A bump rubber 4 is secured to the retainer 3 and surrounds the upper end portion of the piston rod 2.

There is provided a shell 5 including the upper shell 6 having an inverted cup shaped configuration with the bottom portion 6A being secured to the shoulder portion 2A of the piston rod 2 together with the retainer 3, and a cylindrical lower shell 7 with the upper end portion being secured by means such as welding to a cylindrical wall portion of the upper shell 6 and having a small diameter lower portion 7A extending around the periphery of the damper main body 1. Shown at 8 is an inner bracket of a mounting rubber that acts also as a bracket supporting an actuator (not shown) for adjusting the damping force of the hydraulic damper. It will be understood that the retainer 3, the upper shell 6 and the bracket 8 are sequentially fitted on the small diameter portion 2B of the piston rod 2, and are secured against the shoulder portion 2A by the nut 9. Shown at 10 is the upper end of an adjusting rod which extends through the piston rod 2 and has on the lower end a damping force adjusting valve mechanism (not shown). At 11 is a cushion rubber acting as a mounting rubber, and at 12 is a mounting member for mounting the device to the body of the vehicle.

A tubular member 13 is secured to the outer periphery of the damper main body 1 and surrounds the upper portion thereof. The lower end 13A is secured by welding and the like, and the upper end 13B constitutes a free end located at a level higher than the cap 1A of the damper main body 1. The tubular member 13 acts to prevent the deterioration of a rubber member 14 which will be described later by directly contacting with the damper main body 1 and also acts to increase the volume of an air chamber 17 which will also be explained later. The tubular member 13 defines around the circumference of the damper main body 1 an annular space 17A as a part of the air chamber 17.

The rubber member 14 has a small diameter end 14A connected sealingly to the upper end 13B of the tubular member 13 by a ring 15, and a large diameter end 14B connected sealingly to the small diameter portion 7A of the lower shell 7 by a ring 16. The rubber member 14 has U-shaped bent portion 14C on the lengthwise intermediate position thereby permitting relative axial movement of the damper main body 1 and the shell 5.

The air chamber 17 is defined by the tubular member 13, the shell 5 and the rubber member 14 and pressurized air is received therein. When the shell 5 approaches or separates from the tubular member 13 in response to the contraction or the extension of the piston rod 2, the air chamber 17 contracts or expands thus acting as an air spring. The air chamber 17 includes the annular space 17A, thus, the volume of the air chamber 17 increases which is effective in improving the operating characteristics of the air spring. Shown at 18 is a bump rubber receiver surrounding the piston rod and being secured to the cap 1A of the damper main body 1 by welding and the like.

The hydraulic damper and air spring device having the construction as described heretofore is usually used as a pair of a vehicle suspension system with the mounting member 12 being connected to the body of the vehicle and the lower end (not shown) of the damper main body 1 being connected to an axle of a wheel.

When vibrations in the vertical direction are applied through the wheel, the shell 5 approaches or separates from the tubular member 13 in response to contraction or extension of the piston rod 2 whereby the air chamber 17 contracts or expands to act as an air spring.

In the aforesaid prior art device, the upper end 13B of the tubular member 13 projects upwards of the cap 1A for closing the upper end of the damper main body 1. Thus, it is difficult to reliably secure the cap 1A to the damper main body 1 by a seam welding process or the like owing to the presence of the tubular member 13 when the lower end 13A thereof has been welded to the main body 1 in advance. Accordingly, the welding of the tubular member 13 on the damper main body 1 is performed as the last process. Thus, in prior art process, the location on the outer periphery of the main body 1 where the lower end 13A of the tubular member 13 is welded is masked, a predetermined painting is applied on the outer surface of the main body 1, constituent parts such as a piston and the like are assembled into the main body 1, the cap 1A is welded to the main body 1 by seam welding, the lower end 13A of the tubular member 13 is welded on the outer periphery of the main body 1 after removing the mask, and thereafter, corrective painting is applied on and around welded portion 19.

However, there are shortcomings that the corrective painting is not sufficient to prevent corrosion, and the rust may form a through hole or a crack in the welded portion 19 thereby causing leakage of pressurized air in the air chamber 17 and may reduce the strength thereby causing breakage since the welded portion 19 receives the pressure in the air chamber 17 and transmits the axial force of the air spring.

SUMMARY OF THE INVENTION

An object of the present invention is to overcome the shortcomings in the prior art device and to provide a hydraulic damper and air spring unit which enables to omit the masking process in the prior art, to improve the reliability in the welding process, and to reliably prevent the leakage of pressurized air and the breakage.

The hydraulic damper and air spring unit according to the invention is of the type including a hydraulic damper main body provided with a piston rod slidingly projecting therefrom, a tubular member with one end thereof being secured to the outer periphery of the main body and the other end extending toward the upper end of the main body, and a rubber member being provided between the other end of the tubular member and a member secured to the projecting end of the piston rod to define an air chamber surrounding the piston rod and the upper portion of the main body; and wherein, the tubular member comprises an annular spacer with one end being sealingly secured to the outer periphery of the damper main body and having an annular shoulder at the other end, and a piston member having a retaining portion on one end and being engageable with the shoulder on the spacer and a tubular portion surrounding the upper portion of the damper main body and connected to the rubber member, and the retaining portion being sealingly connected to the shoulder.

BRIEF DESCRIPTION OF THE DRAWINGS

Other objects and effects of the invention will become apparent from the following description of some preferred embodiments of the invention with reference to the drawings, wherein:

FIG. 2 is a partial sectional view showing a second embodiment of the invention;

FIG. 3 is a partial sectional view showing a third embodiment of the invention, and FIG. 4 is a longitudinal sectional view showing a prior art device.

DETAILED DESCRIPTION OF PREFERRED EMBODIMENTS

Figure 1:
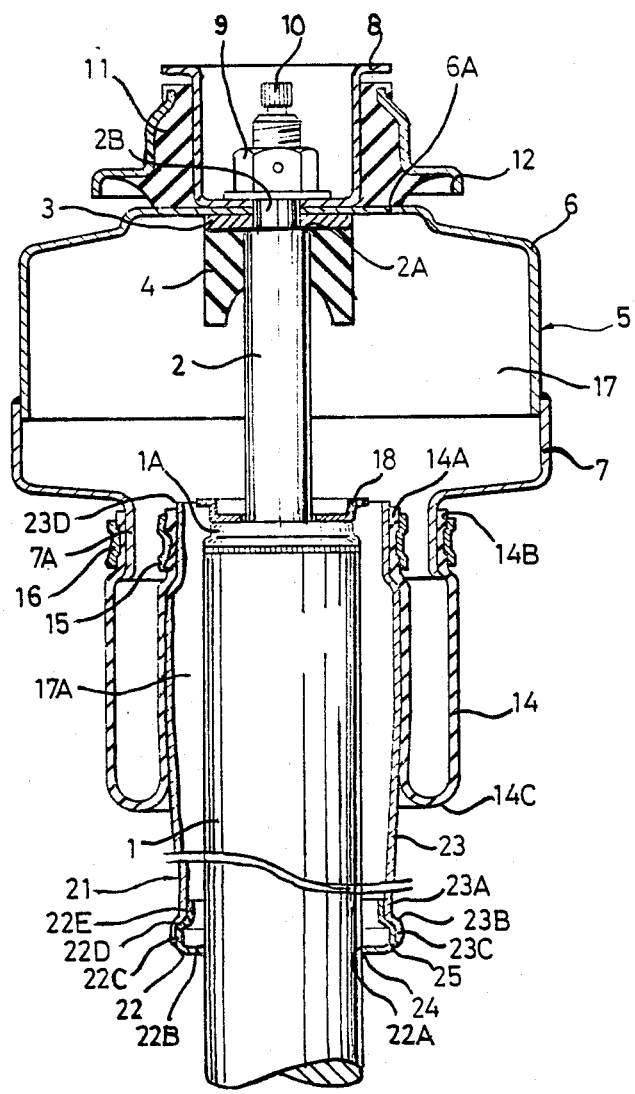
FIG. 1 is a longitudinal sectional view showing an embodiment according to the present invention.

FIG. 1 shows a first embodiment of the invention, and is generally similar to the prior art shown in FIG. 4, thus, the same reference numeral are applied to corresponding parts and detailed description therefor is omitted.

Shown at 21 in FIG. 1 is a tubular member cooperating with the lower shell 7, the rubber member 14 and the like define the air chamber 17, and the tubular member 21 defines between the outer circumference of the damper main body 1 the annular space 17A of the air chamber 17, similarly to the tubular member 13 in FIG. 4. The tubular member 21 comprises a spacer 22 and a piston 23. The spacer 22 takes the lowermost position, and has an annular portion 22B having in the central portion an opening 22A corresponding the outer diameter of the main body 1, a tubular portion 22C extending axially upwards from the outer circumferential end of the annular portion 22B, a shoulder portion 22D connected to the upper end of the tubular portion 22C and extending radially inwards in an inclined manner and a small diameter portion 22E extending axially upwards from the radially inner end of the shoulder portion 22D. The spacer 22 is fitted on the outer circumference of the damper main body 1 through the opening 22A and is sealingly secured to the main body 1 by welding and the like.

The piston 23 has a generally tubular form and has on the lower end a small diameter portion 23A for fitting on the outer periphery of the small diameter portion 22E of the spacer 22, an annular retaining portion 23B being bent toward radially outward direction for engaging with the shoulder portion 22D of the spacer 22, and a large diameter portion 23C extending axially downward from the retaining portion 23B and fitting on the outer periphery of the tubular portion 22C. The lower end portion of the piston 23 is fitted on the spacer 22 with the retaining portion 23B engaging the shoulder portion 22D, and the small diameter portion 23A and the large diameter portion 23C fitting respectively on the outer circumference of the small diameter portion 22E and the tubular portion 22C, and the lower end of the large diameter portion 23C is sealingly secured to the outer circumference of the tubular portion 22C by such as $CO_2$ welding process or seam welding process to make welded portion 25.

Thus, the piston 23 is integrally connected to the damper main body 1 through the spacer 22 with the lower end portion of the piston 23 being secured to the spacer 22. The upper end portion 23D of the piston 23 extends upwards surrounding the outer periphery of the damper main body 1 and projects upwards of the cap 1A. The small diameter end 14A of the rubber member 14 and the upper end 23D of the piston 23 are connected sealingly through the ring 15.

The operation of the device shown in FIG. 1 is nearly equal to that of FIG. 4 and the description therefor is omitted.

According to the invention, the tubular member 13 in the prior art is substituted for by a tubular member 21 comprising the spacer 22 and the piston 23; thus, it is possible to omit the masking process which has been performed on the outer surface of the damper main body 1 of the prior art and the desired painting can be applied on the outer surface of the damper main body 1 and the spacer 22 of the invention entirely and it is possible to reliably prevent rust.

In the assembling process, the spacer 22 is fitted on the outer periphery of the damper main body 1 through the opening 22A and the inner peripheral edge of the annular portion 22B is welded to the circumference of the damper main body 1 sealingly. Thereafter, the outer surface of the damper main body 1, the welded portion 24 and the spacer 22 are thoroughly painted to attain reliable rust preventing treatment. Then, inner parts are assembled in the damper main body 1, and the upper end of the main body 1 is closed sealingly by the cap 1A by such as seam welding process. The parts constituting the air spring such as the shell 5, the rubber member 14, the piston 23 and the like together with the mounting bracket 8 and related parts are secured to the projecting end of the piston rod 2 by the nut 9. In the last step, the lower end of the piston 23 is sealingly secured to the spacer 22 with the retaining portion 23B of the piston 23 being engaged on the shoulder portion 22D of the spacer 22 and the small and large diameter portions 23A and 23C being fitted respectively on the outer circumference of the small diameter portion 22E and tubular portion 22C of the spacer 22, and the piston 23 and the spacer 22 are welded sealingly to make the welded portion 25. Finally, corrective painting is applied on the welded portion 25.

Thus, according to the invention, it is possible to apply the desired painting or surface treatment on the entire outer surface of the damper main body 1, and the welded portion 24 and the spacer 22 reliably prevent generation of rust from on or near to the welded portion 24 and can reliably maintain the mechanical strength of this portion. Further, because the retaining portion 23B of the piston 23 engages with the shoulder portion 22D of the spacer 22 which can reliably transmit the axial force between the piston 23 and the spacer 22, any large force does not act on the welded portion 24, and rust on the welded portion 24 does not have any effect on the strength of the air spring.

Further, the small and large diameter portions 23A and 23C of the piston 23 are fitted respectively on the outer periphery of the small diameter portion 22E and the tubular portion 22C, thus, it is possible to prevent eccentrical load on the welded portion 25 even though an eccentrical load is applied on the piston 23. Further, the retaining portion 23B and the shoulder portion 22D act as radial flange for preventing the radial expansion of the piston 23 and the spacer 22 caused by the pressure in the annular space 17A.

FIG. 2 shows a second embodiment, wherein the spacer 22 has a tubular portion 22F extending upwards from the radially inner edge 22A of the annular portion 22B and along the circumference of the damper main body 1. Both of the upper and lower edges of the tubular portion 22F are welded to the damper main body 1 to form the welded portion 24 and a welded portion 26.

FIG. 3 shows a third embodiment, wherein a spacer 32 generally similar to the spacer 22 in FIG. 1 has a radially outwardly bent portion to define a shoulder portion 32D. The spacer 32 includes an annular portion 32B having an opening 32A, a tubular portion 32C extending upwards of and connected to the annular portion 32B, the shoulder portion 32D radially outwardly bent from the tubular portion 32C, and large diameter portion 32E extending axially upwards. The piston 23 in FIG. 1 is modified to a piston 33 having on the lower end a retaining portion 33B, a large diameter portion 33A and small diameter portion 33C corresponding respectively to the shoulder portion 32D, the large diameter portion 32E and the small diameter portion 32C of the spacer 32.

The operation and effect of the second and the third embodiments are similar to that of the first embodiment and the detailed description therefor is omitted.

In the above embodiments, the upper end 23D of the piston 23 projects upwards of the cap 1A of the damper main body 1, however, the invention includes modified forms such as the upper end of the piston being below the welded portion between the damper main body 1 and the cap 1A.

As described heretofore, according to the invention, the tubular member is constituted of a spacer having an annular shoulder and a piston having a retaining portion engageable with the annular shoulder, the spacer is sealingly secured to the damper main body and the piston is sealingly secured to the spacer. Thus, it is possible to omit the masking process on the outer surface of the damper main body and to apply a predetermined painting on the entire outer surface of the damper main body and the spacer which enables to reliably prevent the rust. Further, the piston engages the shoulder portion of the spacer thereby supporting the axial force, which enables to maintain the strength of the piston during a long time period. The welded portion between the spacer and the piston aims to attain sealing function solely, and the rust on that portion would not have any substantial effects on the strength of the piston and of the spacer.

What is claimed is:

1. A hydraulic damper and air spring unit comprising:
   a hydraulic damper main body provided with a piston rod slidingly projecting therefrom;
   a tubular member with one end thereof being secured to the outer periphery of said damper main body and the other end extending toward the upper end of said main body;
   a rubber member being provided between a member secured to the projecting end of said piston rod and the other end of said tubular member to define an air chamber surrounding said piston rod and the upper portion of said main body;
   said tubular member including an annular spacer with one end being sealing welded to the outer periphery of said damper main body and having a diametrical stepped portion defining an annular shoulder; and
   a piston member having a retaining portion on one end for engaging with said annular shoulder on said annular spacer and a tubular portion surrounding said damper and connected to said rubber member, said piston member being sealingly connected to said annular spacer.

2. A hydraulic damper and air spring unit as set forth in claim 1, wherein said spacer comprises generally cylindrical large and small diameter portions defining said shoulder therebetween.

3. A hydraulic damper and air spring unit as set forth in claim 2, wherein said spacer further comprises a radial flange with the radially inner end thereof being sealingly secured to the outer periphery of the damper main body and the radially outer end being secured to the lower end of said small diameter cylindrical portion.

4. A hydraulic damper and air spring unit as set forth in claim 2, wherein said spacer further comprises a radial flange with the radially inner end thereof being sealingly secured to the outer periphery of the damper main body and the radially outer end being secured to the lower end of said large diameter cylindrical portion.

5. A hydraulic damper and air spring unit as set forth in claim 4, wherein the radially inner end of the radial flange is integrally connected to a cylindrical portion, and the cylindrical portion is adapted to fit on the damper main body.

* * * * *